(12) United States Patent
Weiss

(10) Patent No.: US 9,791,002 B2
(45) Date of Patent: Oct. 17, 2017

(54) HOLD AND RELEASING MECHANISM FOR HOLDING AND RELEASING A CABLE TAKE-UP DEVICE

(71) Applicant: SRAM Deutschland GmbH, Schweinfurt (DE)

(72) Inventor: Martin Weiss, Schweinfurt (DE)

(73) Assignee: SRAM Deutschland GmbH, Schweinfurt (DE)

( * ) Notice: Subject to any disclaimer, the term of this patent is extended or adjusted under 35 U.S.C. 154(b) by 0 days.

(21) Appl. No.: 14/468,419

(22) Filed: Aug. 26, 2014

(65) Prior Publication Data

US 2015/0075321 A1  Mar. 19, 2015

(30) Foreign Application Priority Data

Aug. 26, 2013 (DE) ........................ 10 2013 216 932

(51) Int. Cl.
*G05G 1/00* (2006.01)
*F16D 41/12* (2006.01)
*B62M 25/04* (2006.01)
*B62K 23/06* (2006.01)
*F16C 1/22* (2006.01)

(52) U.S. Cl.
CPC .............. *F16D 41/12* (2013.01); *B62K 23/06* (2013.01); *B62M 25/04* (2013.01); *F16C 1/223* (2013.01); *Y10T 74/2133* (2015.01)

(58) Field of Classification Search
CPC ......... F16D 41/12; F16C 1/223; B62K 23/06; B62M 25/04
See application file for complete search history.

(56) References Cited

U.S. PATENT DOCUMENTS

| 5,241,878 | A | † | 9/1993 | Nagano |
| 5,325,735 | A | | 7/1994 | Nagano |
| 5,730,030 | A | | 3/1998 | Masui |

(Continued)

FOREIGN PATENT DOCUMENTS

| EP | 0361335 B1 | 2/1994 |
| EP | 0785128 A2 | 7/1997 |

(Continued)

*Primary Examiner* — Vicky Johnson
(74) *Attorney, Agent, or Firm* — Milan Milosevic; Lisa Serdynski

(57) ABSTRACT

A hold and release mechanism for holding and releasing a cable includes a toothed-disk arrangement coupled with the cable take-up device for rotating together about a first axis. The toothed-disk arrangement includes a plurality of teeth at an outer periphery of the toothed-disk arrangement. The plurality of teeth includes locking and safety teeth. The locking teeth are disposed in a first tooth plane orthogonal to the first axis. The safety teeth are disposed in a second tooth plane that is orthogonal to the first axis and offset relative to the first tooth plane. An adjustable locking pawl pivotably mounted about a second axis includes locking and safety catches. The locking catch engages with one of the locking teeth for holding the toothed-disk arrangement in a first rotational position. The safety catch engages with one of the safety teeth for holding the toothed-disk arrangement in a second rotational position.

16 Claims, 9 Drawing Sheets

(56) References Cited

U.S. PATENT DOCUMENTS

| | | | |
|---|---|---|---|
| 6,450,060 B1 * | 9/2002 | Shahana | 74/502.2 |
| 6,502,477 B1 | 1/2003 | Assel | |
| 7,000,496 B2 * | 2/2006 | Wessel | B62M 25/04 |
| | | | 74/488 |
| 7,152,497 B2 | 12/2006 | Sato | |
| 7,628,095 B2 † | 12/2009 | Funai | |
| 8,272,293 B2 † | 9/2012 | Miki | |
| 8,584,550 B1 * | 11/2013 | Calendrille, Jr. | 74/502.2 |
| 8,746,105 B2 * | 6/2014 | Kawakami | B62M 25/04 |
| | | | 74/501.6 |
| 9,132,887 B2 * | 9/2015 | Kawakami | B62M 25/04 |
| 2003/0221507 A1 | 12/2003 | Wessel et al. | |
| 2013/0220057 A1 * | 8/2013 | Kawakami et al. | 74/501.6 |

FOREIGN PATENT DOCUMENTS

| | | | |
|---|---|---|---|
| EP | 0849157 A2 | | 6/1998 |
| EP | 1366981 B1 | | 1/2010 |
| EP | 1232940 B2 | | 8/2012 |
| FR | 2701917 A1 | | 9/1994 |
| GB | 2183796 A | † | 6/1987 |

\* cited by examiner
† cited by third party

HOLD AND RELEASING MECHANISM FOR HOLDING AND RELEASING A CABLE TAKE-UP DEVICE

BACKGROUND OF THE INVENTION

The invention relates to a holding and releasing mechanism for holding and releasing a cable take-up device of a step shifter, for example, and a step shifter comprising the holding and releasing mechanism, as well as a system which in turn comprises the step shifter.

Step shifters in which a holding and releasing mechanism—according to the invention can be used are particularly useful in bicycles. They can assist the user of the bicycle to wind and release the shifting cable step-by-step wherein the actuating levers generally return back to the initial position after they are actuated. The term "trigger switch" or "trigger shifter" may be used interchangeably for step shifter.

Step shifters, or trigger switches, are known from patent specifications EP 0 361 335 B1, EP 1 232 940 B2, EP 1 366 981 B1 and FR 2 701 917 A1, among others.

Known step shifters each comprise a cable pull-up or winding mechanism for the shifting cable as well as a mechanism for holding and releasing the shifting cable. The present invention relates to an especially advantageous embodiment of a holding and releasing mechanism as well as a step shifter in which this holding and releasing mechanism is used, as well as a shifting system in which this step shifter is in turn used.

The holding and releasing mechanism of EP 0 361 335 B1 comprises first and second locking elements that pivot in opposite directions for alternatingly engaging into a toothed locking disk. In a release, the locking element presently engaged with the locking disk is disengaged out from the locking disk. The locking disk can now rotate until the other respective locking element engages with the locking teeth. When the release handle is returned back to its initial position, the second locking element moves out of engagement with the locking disk and the locking disk moves until it re-engages the first locking element.

A holding and releasing mechanism is known from EP 1 232 940 B2. Here, a pivotable locking latch has a locking catch which initially engages with a first tooth of a locking disk, which fixes the locking disk. When the locking catch is now pivoted out of the engagement area of the first tooth, the locking disk can be rotated to the point that a tooth of the locking disk adjacent to the first tooth comes into engagement with a safety catch of the latch which is pivoted at the same time into the engagement area of the teeth. If the locking latch is now pivoted back to its initial position, the locking toothed disk can rotate further until the locking catch of the locking latch comes into engagement with a third tooth which is also adjacent to the first tooth, the locking toothed disk being held there again.

Another holding and releasing mechanism is known from EP 1 366 981 B1 in which a slidingly held locking latch engages alternatingly with locking and safety teeth disposed on opposite sides of a locking toothed disk when a release lever is actuated.

Finally, also known from FR 2 701 917 A1 is a holding and releasing mechanism in which a locking latch initially engages with a locking tooth by way of a locking catch. When a release lever is actuated, the locking latch pivots such that the locking catch comes out of engagement with the locking tooth, whereupon a safety catch of the latch comes into engagement with a safety tooth while the locking toothed disk has rotated by a specific angular amount. When the locking latch is pivoted back, the locking catch thereof re-engages with a locking tooth.

BRIEF SUMMARY OF THE INVENTION

In consideration of the known holding and releasing mechanisms for step shifters, it is now an object of the present invention to provide such a holding and releasing mechanism that enables a particularly compact and space-saving design. In particular, it is an object of the present invention to provide a hold and release mechanism that allows a particularly large number of actuation positions due to the design thereof. A further object of the present invention is to provide a reliably functioning hold and release mechanism. Another object of the present invention is to provide a hold and release mechanism that facilitates ease of adjustability for the overall system incorporating the mechanism.

To achieve at least one of the objects, according to a first aspect, a hold and release mechanism is provided for holding and releasing a cable take-up device of a step shifter, for example. The mechanism holds an actuating cable by way of the cable take-up device in a plurality of actuation positions comprising an actuation position of maximum pull-out (wherein cable is released or unwound therefrom) of the actuation cable out of or off of the cable take-up device and an actuation position of maximum pull-in (wherein cable has been take-in or wound on) of the actuation cable into the cable take-up device. The mechanism provides stepped release of the actuation cable in a pull-out direction and includes a toothed-disk arrangement that is part of the cable take-up device as a single piece or is connected or can be connected rigidly thereto and can rotate therewith about a first axis. The toothed-disk arrangement comprises a plurality of teeth at the outer periphery thereof. An adjustable locking latch or locking pawl is preferably pivotable about a second axis. The latch, in a first position when the toothed-disk arrangement is located in any of various first rotational positions, in particular in a first rotational position engaging by way of a locking catch with a tooth from the plurality of teeth that acts as a locking tooth associated with the respective first rotational position, holds or stops the toothed-disk arrangement and thereby the cable take-up device in the respective first rotational position. The latch also, in a second position when the toothed-disk arrangement is located in various second rotational positions, in particular in a second rotational position engaging by way of a safety catch with a tooth from the plurality of teeth that acts as a safety tooth associated with the respective second rotational position, holds or stops the toothed-disk arrangement and thereby the cable take-up device in the respective second rotational position. The first rotational positions correspond to the actuation positions of the actuation cable or a subset of the actuation positions and the second rotational positions correspond to intermediate positions of the actuation cable when the actuation cable is transitioned between adjacent actuation positions through release of the actuation cable.

According to the invention, the plurality of teeth of the toothed-disk arrangement comprises a first group of teeth and a second group of teeth. The teeth of the first group of teeth act as locking teeth and are disposed in a first tooth plane orthogonal to the first axis. The teeth of the second group of teeth act as safety teeth and are disposed in a second tooth plane that is orthogonal to the first axis and offset relative to the first tooth plane. This results in a particularly large angular range of the toothed disks arrangement for arranging the respective groups of teeth, which permits a space-saving design of the hold and release mechanism, and in particular a large number of actuation positions.

In a hold and release mechanism according to the invention, the first group of teeth can have the same number of teeth as the second group of teeth, wherein this number can preferably correspond to the number of actuation positions of the actuation cable.

Furthermore, with regard to the geometric design of the hold and release mechanism it can be advantageous to design the locking latch in such a way that the locking catch is located in the first tooth plane and the safety catch is located in the second tooth plane.

It is an advantage that the teeth of the first group of teeth extend over a first angular range relative to the first rotational axis and the teeth of the second group of teeth extent over a second angular range relative to the first rotational axis, the second range overlapping the first angular range.

The toothed disk arrangement can be manufactured by having it be comprised of two toothed disks that are connected together rigidly, one of which contains the first group of teeth and the second of which contains the second group of teeth. This allows for a simplified and cost-effective manufacture of the toothed disk arrangement. Alternatively, it is of course also possible to manufacture the toothed disk arrangement and both tooth planes in one piece.

To achieve at least one of the objects, according to a second aspect a hold and release mechanism is provided for holding and releasing a cable take-up device of a step shifter for example, for holding an actuating cable held by way of the cable take-up device in a plurality of actuation positions comprising an actuation position of maximum pull-out of the actuation cable out of the cable take-up device and an actuation position of maximum pull-in of the actuation cable into the cable take-up device and for stepped releasing of the actuation cable in a pull-out direction. The mechanism comprises a toothed-disk arrangement that is part of the cable take-up device as a single piece or is connected or can be connected rigidly thereto and can rotate therewith about a first axis. The toothed-disk arrangement comprises a plurality of teeth at the outer periphery thereof. An adjustable locking latch is preferably pivotable about a second axis. The latch, in a first position when the toothed-disk arrangement is located in various first rotational positions, in particular in a first rotational position engaging by way of a locking catch with a tooth from the plurality of teeth that acts as a locking tooth associated with the respective first rotational position, holds or stops the toothed-disk arrangement and thereby the cable take-up device in the respective first rotational position. The latch also, in a second position when the toothed-disk arrangement is located in various second rotational positions, in particular in a second rotational position engaging by way of a safety catch with a tooth from the plurality of teeth that acts as a safety tooth associated with the respective second rotational position, holds or stops the toothed-disk arrangement and thereby the cable take-up device in the respective second rotational position. The first rotational positions correspond to the actuation positions of the actuation cable or a subset of the actuation positions and the second rotational positions correspond to intermediate positions of the actuation cable when the actuation cable is transitioned between adjacent actuation positions through release of the actuation cable.

According to the invention, the actuation position of maximum pull-out of the actuation cable is not associated with any of the plurality of teeth acting as a stopping tooth, so that the stopping and holding of the toothed-disk arrangement in a rotational position of the toothed-disk arrangement corresponding to the actuation position of maximum pull-out of the actuation cable, and thus the cable take-up device, is not achieved through engagement of the locking catch with a tooth. This makes it possible for the actuation position of maximum pull-out of the actuation cable to be finely adjusted within a certain range independent of the holding and releasing mechanism. In the process, the first and second groups of teeth can be arranged as depicted above into two planes separated from one another, but they can also lie in the same plane according to the invention. Both possible arrangements of teeth permit a flexible design of toothed-disk arrangement and thereby an advantageously compact hold and release mechanism.

To achieve at least one of the objects, according to a third aspect a hold and release mechanism is provided for holding and releasing a cable take-up device of a step shifter for example, for holding an actuating cable held by way of the cable take-up device in a plurality of actuation positions comprising an actuation position of maximum pull-out of the actuation cable out of the cable take-up device and an actuation position of maximum pull-in of the actuation cable into the cable take-up device and for stepped releasing of the actuation cable in a pull-out direction. The mechanism comprises a toothed-disk arrangement that is part of the cable take-up device as a single piece or is connected or can be connected rigidly thereto and can rotate therewith about a first axis. The toothed-disk arrangement comprises a plurality of teeth at the outer periphery thereof. An adjustable locking latch is preferably pivotable about a second axis. The latch, in a first position when the toothed-disk arrangement is located in various first rotational positions, in particular in a first rotational position engaging by way of a locking catch with a tooth from the plurality of teeth that acts as a locking tooth associated with the respective first rotational position, holds or stops the toothed-disk arrangement and thereby the cable take-up device in the respective first rotational position. The latch also, in a second position when the toothed-disk arrangement is located in various second rotational positions, in particular in a second rotational position engaging by way of a safety catch with a tooth from the plurality of teeth that acts as a safety tooth associated with the respective second rotational position, holds or stops the toothed-disk arrangement and thereby the cable take-up device in the respective second rotational position, wherein the first rotational positions correspond to the actuation positions of the actuation cable or a subset of the actuation positions and the second rotational positions correspond to intermediate positions of the actuation cable when the actuation cable is transitioned between adjacent actuation positions through release of the actuation cable.

According to the invention, the toothed-disk arrangement and thereby the cable take-up device can be transitioned from a rotational position corresponding to an actuating cable actuation position that precedes the actuation position of maximum pull-out of the actuation cable, directly to a rotational position of the toothed-disk arrangement that corresponds to the actuation position of maximum pull-out of the actuation cable and thereby of the cable take-up device by releasing the actuation cable without holding the toothed-disk arrangement and thereby the cable take-up device at an intermediate position by way of the safety catch and a tooth of the plurality of teeth that acts as a safety tooth. Since in such a hold and release mechanism the number of locking and/or safety teeth can be reduced, it can be designed to be particularly compact.

To achieve at least one of the objects, according to a fourth aspect a hold and release mechanism is provided for holding and releasing a cable take-up device of a step shifter for example, for holding an actuating cable held by way of the cable take-up device in a plurality of actuation positions comprising an actuation position of maximum pull-out of the actuation cable out of the cable take-up device and an actuation position of maximum pull-in of the actuation cable into the cable take-up device and for stepped releasing of the actuation cable in a pull-out direction. The mechanism comprises a toothed-disk arrangement that is part of the cable take-up device as a single piece or is connected or can be connected rigidly thereto and can rotate therewith about a first axis. The toothed-disk arrangement comprises a plurality of teeth at the outer periphery thereof; an adjustable locking latch preferably pivotable about a second axis. The latch, in a first position when the toothed-disk arrangement is located in various first rotational positions, in particular in a first rotational position engaging by way of a locking catch with a tooth from the plurality of teeth that acts as a locking tooth associated with the respective first rotational position, holds or stops the toothed-disk arrangement and thereby the cable take-up device in the respective first rotational position. The latch also, in a second position when the toothed-disk arrangement is located in various second rotational positions, in particular in a second rotational position engaging by way of a safety catch with a tooth from the plurality of teeth that acts as a safety tooth associated with the respective second rotational position, holds or stops the toothed-disk arrangement and thereby the cable take-up device in the respective second rotational position. The first rotational positions correspond to the actuation positions of the actuation cable or a subset of the actuation positions and the second rotational positions correspond to intermediate positions of the actuation cable when the actuation cable is transitioned between adjacent actuation positions through release of the actuation cable.

According to the invention, relative to the first rotational axis an angular distance between the locking catch and the safety catch of the locking latch is larger than twice the angular distance, or double the minimum angular distance, between the directly adjacent teeth that act as locking teeth, and is smaller than the angular distance of the rotational positions of the toothed-disk arrangement corresponding to the actuation positions of maximum pull-out and maximum pull-in of the actuation cable, respectively.

In an advantageous embodiment, the majority of the teeth of the toothed-disk arrangement include a group of teeth that act both as locking teeth and safety teeth depending on the rotational position of the toothed-disk arrangement, wherein the toothed-disk arrangement preferably comprises a toothed disk that includes the group of teeth. This can reduce the total number of teeth in the toothed-disk arrangement, which has a particularly advantageous effect on the number of possible actuation positions of the toothed-disk arrangement.

In the process, relative to the first rotational axis, i.e. the rotational axis of the toothed-disk arrangement, the angular distance between the locking catch and the safety catch of the locking latch can furthermore be greater than an angular distance or a minimum angular distance between directly adjacent teeth of the group of teeth that act both as locking teeth and as safety teeth depending on the rotational position of the toothed-disk arrangement. It can also be provided that relative to the rotational axis of the toothed-disk arrangement the angular distance between the locking catch and the safety catch of the locking latch is greater than an angular distance or a minimum angular distance between two teeth of the first number of teeth acting as locking teeth and smaller than the largest distance between two teeth of this first number of teeth. Both improvement suggestions allow for an advantageous and space-saving design of the hold and release mechanism.

For further improvement of the holding characteristics of the hold and release mechanism according to the invention, the locking latch can be biased in the direction of the first position thereof by way of a first spring arrangement.

In order to further facilitate the pull-out of the actuation cable, the toothed-disk arrangement or cable take-up device can also be biased by way of a second spring arrangement in the direction of pull-out of the actuation cable.

In a hold and release mechanism according to the invention, the first axis and the second axis can be either essentially parallel or can be tilted relative to one another by a pre-determined angle.

Also, in a hold and release mechanism according to the invention, a lock-out device can be provided which is designed for removing or keeping removed the locking latch out of the first rotational position thereof in at least one pre-determined rotational angle range of the toothed-disk arrangement encompassing at least one rotational position of the toothed-disk arrangement corresponding to an actuation position of the actuation cable. The lock-out device can comprise at least a cam element that is part of the cable take-up device or the toothed-disk arrangement in one piece or is connected to one of them rigidly and is designed to act directly on the locking latch or act thereon through at least one other element of the lock-out device so that the locking latch is removed from the first pivot position thereof or kept removed therefrom.

One of the objects cited above is also achieved by way of a hold and release mechanism of this class, the mechanism comprising a lock-out device as mentioned in the paragraph directly above. The applicant claims independent protection for this.

In particular, the at least one pre-determined rotational angle range of the toothed-disk arrangement can include the rotational position of the toothed-disk arrangement corresponding to the actuation position of maximum pull-out of the actuation cable.

In a hold and release mechanism according to the invention, the locking latch can be shifted in the pull-out direction from the first position toward the second position by at least one step using an actuation device for purposes of releasing the actuation cable. It is primarily conceived that the locking latch can pivot from the first pivot position toward the second pivot position.

It is an advantage that the hold and release mechanism according to the invention can be designed such that the toothed-disk arrangement can assume six, preferably at least eight, at most preferably at least ten different rotational positions, each of which can be assigned to an actuation position of the actuation cable.

Although the object according to the invention is achieved by way of a hold and release mechanism according to one of the four aspects of the invention, alternatively incorporating one or more of the improvement suggestions, it is of course feasible that the first, second, third and fourth aspects of the invention can also be implemented in combination.

Furthermore, the present invention provides a step shifter, in particular for a bicycle, for actuating at least one device, for example a switching arrangement that can be actuated for selecting gears of a bicycle gear shifting mechanism, using an actuation cable. The step shifter according to the invention comprises a rotatable cable take-up device that holds the actuation cable. The take-up device is rotatable between rotational positions corresponding to a plurality of actuation positions of the actuation cable and that include an actuation position of maximum pull-out of the actuation cable and an actuation position of maximum pull-in of the actuation cable. The cable take-up device can be held or stopped from rotating in a release direction by way of a hold and release mechanism according to the invention according to at least one of the listed aspects one through four in a plurality of first rotational positions of the cable take-up device and can be released in a pull-out direction for rotation in the release direction by way of the hold and release mechanism according to the invention for step-by-step releasing of the actuation cable.

Furthermore, the step shifter according to the invention can comprise a manually actuatable pull-in mechanism that acts directly or indirectly on the cable take-up device. The pull-in mechanism is able to rotate the cable take-up device step-by-step in a pull-in direction opposite to the release direction between the rotational directions corresponding to the actuation positions of the actuation cable.

The present invention also provides a system comprising a step shifter according to the invention and a device that can be actuated by way of the step shifter according to the invention and the actuation cable. To this end, it is suggested that the device should include a return spring arrangement that biases the actuation cable in the direction of the actuation position of maximum pull-out.

It is advantageous that the actuation cable can be connected to a moveably arranged element of the device, the element being biased by the return spring arrangement in the direction to a preferably adjustable stop position corresponding to the actuation position of maximum pull-out of the actuation cable and in which no biasing forces from the return spring arrangement are exerted on the actuation cable. In this regard, the invention suggestions can be implemented according to the second and third aspect in particularly advantageous manner.

In the case of a derailleur of a bicycle chain switching system as the device to be actuated by way of the step shifter, adjustment of a derailleur base position can be made this way.

These and other features and advantages of the present invention will be more fully understood from the following description of one or more embodiments of the invention, taken together with the accompanying drawings.

BRIEF DESCRIPTION OF THE SEVERAL VIEWS OF THE DRAWINGS

In the drawings:

FIG. 2-8 are top views of a step shifter according to the invention that comprises a second embodiment of a hold and release mechanism according to the invention, wherein FIGS. 2 through 6 illustrate a transition of the hold and release mechanism from a fourth to a fifth actuation position, FIG. 7 shows the hold and release mechanism in a ninth actuation position and FIG. 8 illustrates an actuation position of maximum pull-out;

DETAILED DESCRIPTION OF THE INVENTION

Embodiments of the invention are described below with reference to the drawings.

Figure 1:
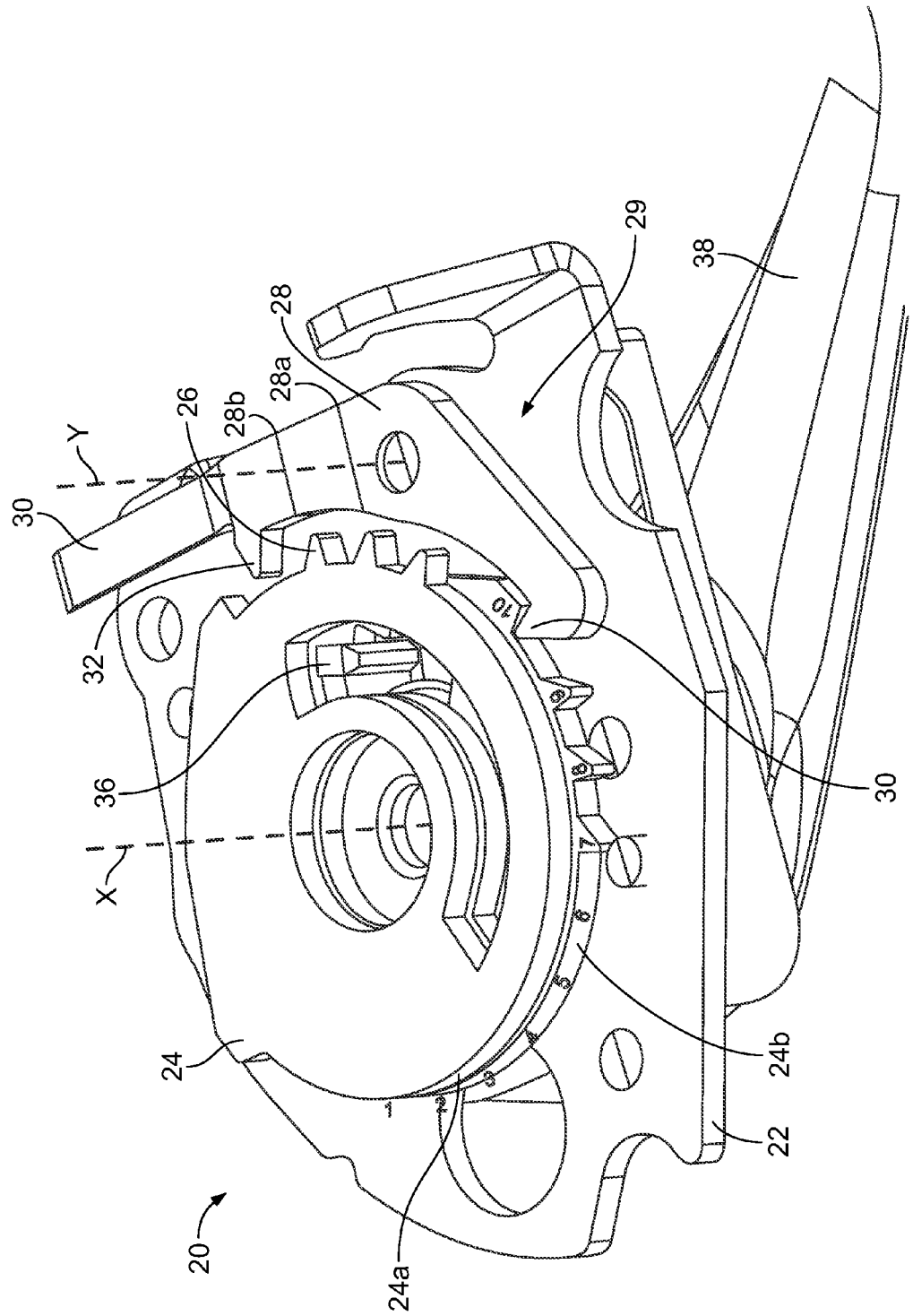
FIG. 1 is a perspective top view of a step shifter according to the invention that comprises a first embodiment of a hold and release mechanism according to the invention.

Shown in FIG. 1 in an oblique top view is a step shifter 20 according to the invention. The step shifter 20 comprises a base plate 22 to which is attached a toothed-disk arrangement 24 that can rotate about an axis X. Here, the device used for attachment is left out of the figure for reasons of clarity. The toothed-disk arrangement comprises an upper toothed disk 24a and a lower toothed disk 24b which on one hand are connected rigidly to one another and on the other hand are connected rigidly to a cable take-up device, which is not shown.

The step shifter further comprises a locking latch 28 that can pivot about a second axis Y, one end of the latch having a locking catch 30 that faces the toothed-disk arrangement 24 and the other end thereof having a safety catch 32 likewise facing the toothed-disk arrangement 24. The locking latch 28 may also be referred to as a locking pawl. Here, the axis of rotation X of the toothed-disk arrangement and the pivot axis Y of the locking latch 28 are aligned parallel to one another. Two bending edges or angled sections 28a and 28b in the locking latch 28 place the locking catch 30 in the plane of the lower toothed disk 24b and the safety catch 32 in the plane of the upper toothed disk 24a. The locking latch 28 further comprises an obliquely upward pointing engaging element 34 on the side where the safety catch 32 is located, the element being graspable by a first actuation lever, not shown here, in such a way that the locking latch 28 is pivoted about the pivot axis Y thereof.

The step shifter according to the invention can be used to actuate a bicycle gear shifter, for example, in particular a rear derailleur in particular in this case.

The lower toothed disk 24b comprises teeth on the outer periphery thereof at angular positions labeled as 1-10, the teeth also being identified as 1-10 below, and of the positions only the teeth corresponding to angular positions 7-10 are shown in FIG. 1. Also identified below are the actuation positions of the toothed-disk arrangement 28 in which the locking catch 30 and one of teeth 1-10 are engaged, identified as the first through the tenth actuation position. Here, the first actuation position corresponds to the actuation position of maximum pull-in of an actuation cable held by the cable take-up device, whereas in the other actuation positions the actuation cable is pulled successively further out.

The upper toothed disk 24a also comprises a plurality of teeth 26, the number of which is the same as the number of teeth in the lower toothed disk, only four of which are shown in analogous fashion as in the representation of the lower toothed disk.

Also, the step shifter 20 shown comprises a pull-in mechanism 36 which can be actuated by way of a second actuation lever 38. No explanation of the way in which the pull-in mechanism 36 functions is given at this point. For a detailed explanation of such a mechanism, reference is made rather to EP 1 366 981 A2.

The functioning of the hold and release mechanism 29 of the step shifter 20, the mechanism formed through the cooperation of the toothed-disk arrangement 24 and the locking latch 28, is explained below. In the rotational position of the toothed-disk arrangement 24 and the pivot position of the locking latch 28 as shown in FIG. 1, the locking catch 30 of the locking latch 28 and the tooth 10 of the lower toothed disk 24b cooperated in such a way that a clockwise rotation of the toothed-disk arrangement 24 is prevented. Here, the toothed-disk arrangement 24 is biased in the clockwise direction by way of a spring element, which is not shown, whereas the locking latch 28 is biased in the pivot position (the hold position) shown in FIG. 1 by way of another spring element which is also not shown. Here, teeth 1-10 and the locking catch 30 are sloped in such a way that counterclockwise rotation of the toothed-disk arrangement 24 by the pull-in mechanism is possible when the locking latch 28 is in the hold position. In the process, the locking latch 28 pivots out from the hold position for a brief period through the interaction of the sloped teeth 1-10 and the locking catch 30 so that the respective tooth 1-10 can slide past and underneath the locking catch 30. This process corresponds to a switching from a higher gear to a lower gear.

On the other hand, if the user switches from a low gear to a higher one, he must exert a force onto the engaging lug 34 of the locking latch 28 by way of the actuation lever not first shown. This pivots the locking latch 28 from the hold position thereof to a safety position in which the safety catch 32 is pivoted toward the toothed disk 24a, but the locking catch 30 is pivoted away out of engagement with the cogging of the toothed disk 24b. Since as discussed the toothed-disk arrangement 24 is biased in the clockwise direction about axis of rotation X, it begins to rotate in this direction. Since the safety catch 32 is now located in the safety position of the locking latch 28 near teeth 26 of the upper toothed disk 24a, the toothed-disk arrangement 24 can be rotated clockwise but only as far as it takes for the safety catch 32 to engage with the next adjacent or subsequent of the teeth 26 of the upper toothed disk 24a. At the end of the actuation action by the user, the locking latch 28 now pivots back to the hold position due to the pre-tensioning thereof. Since in the process the safety catch 32 and the respective tooth 26 of the upper toothed disk 24a are no longer engaged, the toothed-disk arrangement 24 can now again rotate clockwise until it again comes into engagement between the locking catch 30 and the respective next of the teeth 1-10 of the lower toothed disk 24b.

FIGS. 2-6 illustrate such a release procedure in step-by-step fashion with the aid of a second embodiment of a step shifter 20' according to the invention. The toothed-disk arrangement 24' shown there only consists of a single toothed disk 24' that comprises a number of teeth 1-9 and A-E, this number being higher than the number of actuation positions of the toothed-disk arrangement. The second embodiment of a hold and release mechanism 29' according to the invention shown in FIGS. 2-8 shows the interaction of the toothed-disk arrangement 24' and the locking latch 28'. Here, the toothed-disk arrangement 24' has a total of 14 teeth 1-9 and A-E, all of which are located in a single plane that lies perpendicular to the axis of rotation X of the toothed-disk arrangement 24' directed inward into the plane of the drawing. Accordingly, the locking latch 28' is also designed such that the locking catch 30' and the safety catch 32' thereof lie precisely in this plane. In contrast to the first embodiment shown in FIG. 1, in this second embodiment a portion of the teeth 1-9 and A-E of the toothed-disk arrangement 24' can come into engagement with either the locking catch 30' or the safety catch 32' of the locking latch 28' depending on the rotational position of the toothed-disk arrangement 24' and the pivot position of the locking latch 28'.

Figure 2:
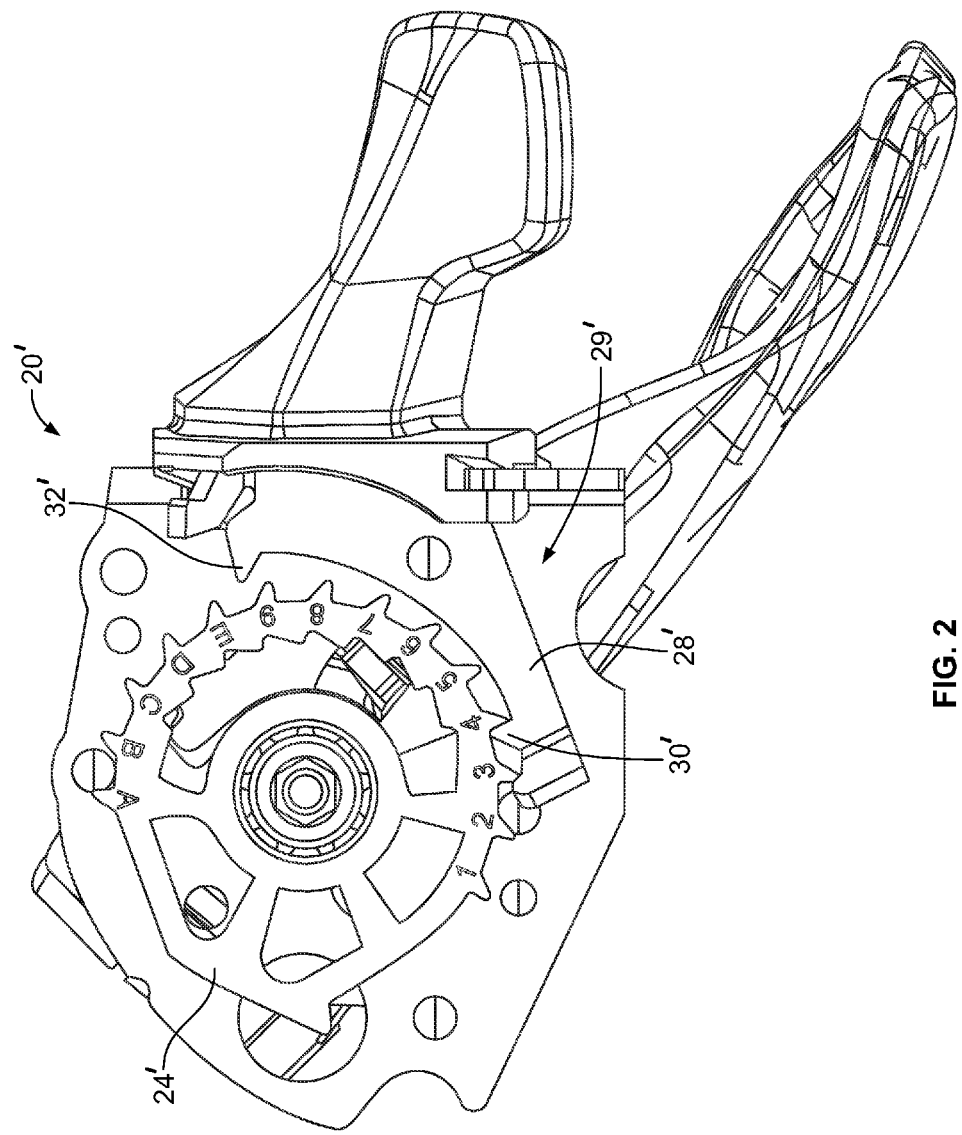

FIGS. 2-6 illustrate a release procedure that corresponds to a transition from a fourth to a fifth actuation position. In FIG. 2, the tooth 4 of the toothed-disk arrangement 24' and the locking catch 30' of the locking latch 28', which is in its hold position, are engaged. Since the toothed-disk arrangement 24' is biased in the clockwise direction and the locking latch 28' is biased toward the hold position shown, the toothed-disk arrangement 24' is fixed in this actuation position.

Figure 3:
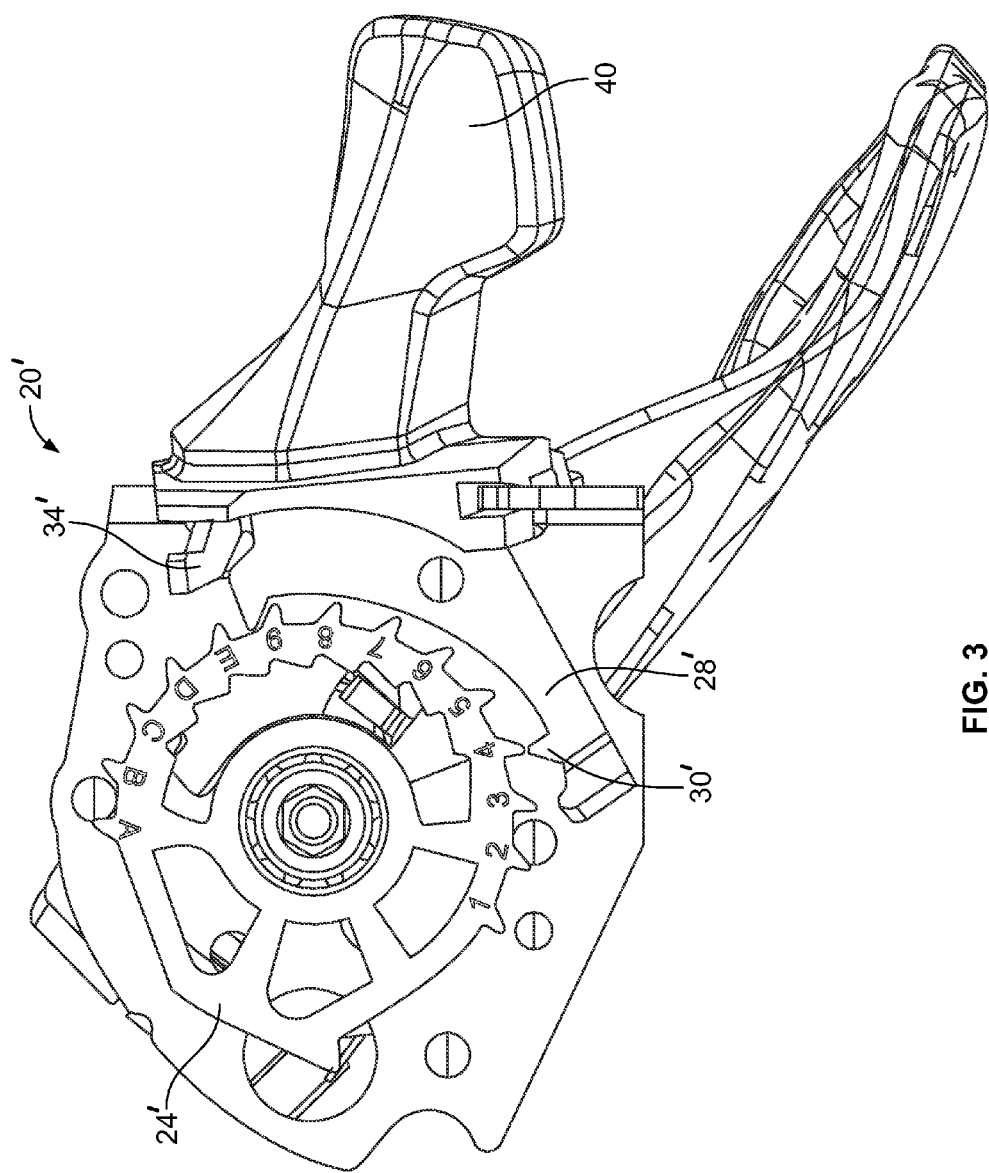

FIG. 3 now shows the beginning of a release actuation of the locking latch 28', which is triggered by an upward push on the actuation lever 40 by a user. This actuation lever 40 acts on the engaging lug 34 of the locking latch 28', pivots it from the hold position thereof in the direction of the safety position thereof. In the pivot position of the locking latch 28' shown in FIG. 3, tooth 4 and the locking catch 30' have just disengaged outward and the toothed-disk arrangement 24' begins to rotate due to the pre-tensioning thereof in the clockwise direction.

Figure 4:
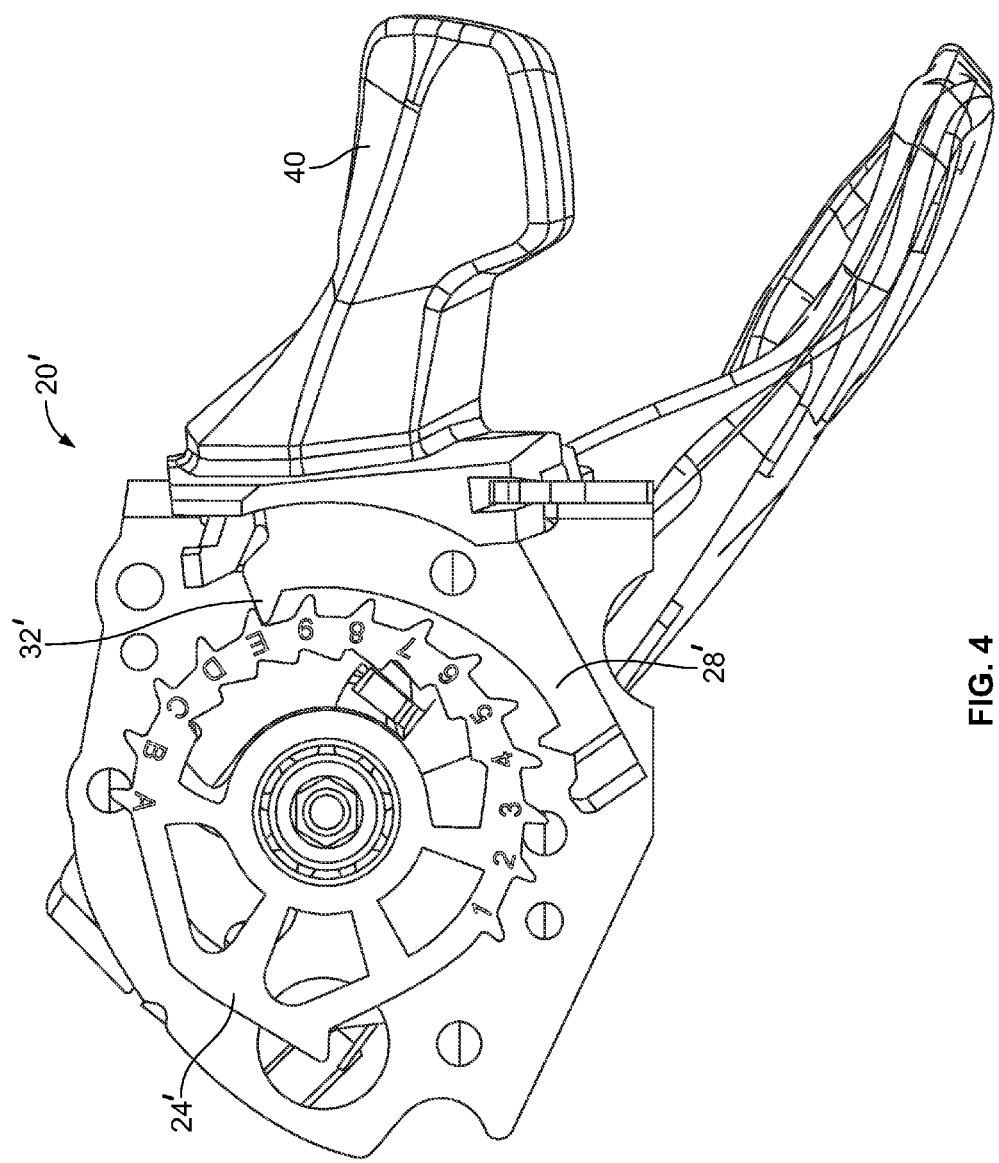
Figure 5:
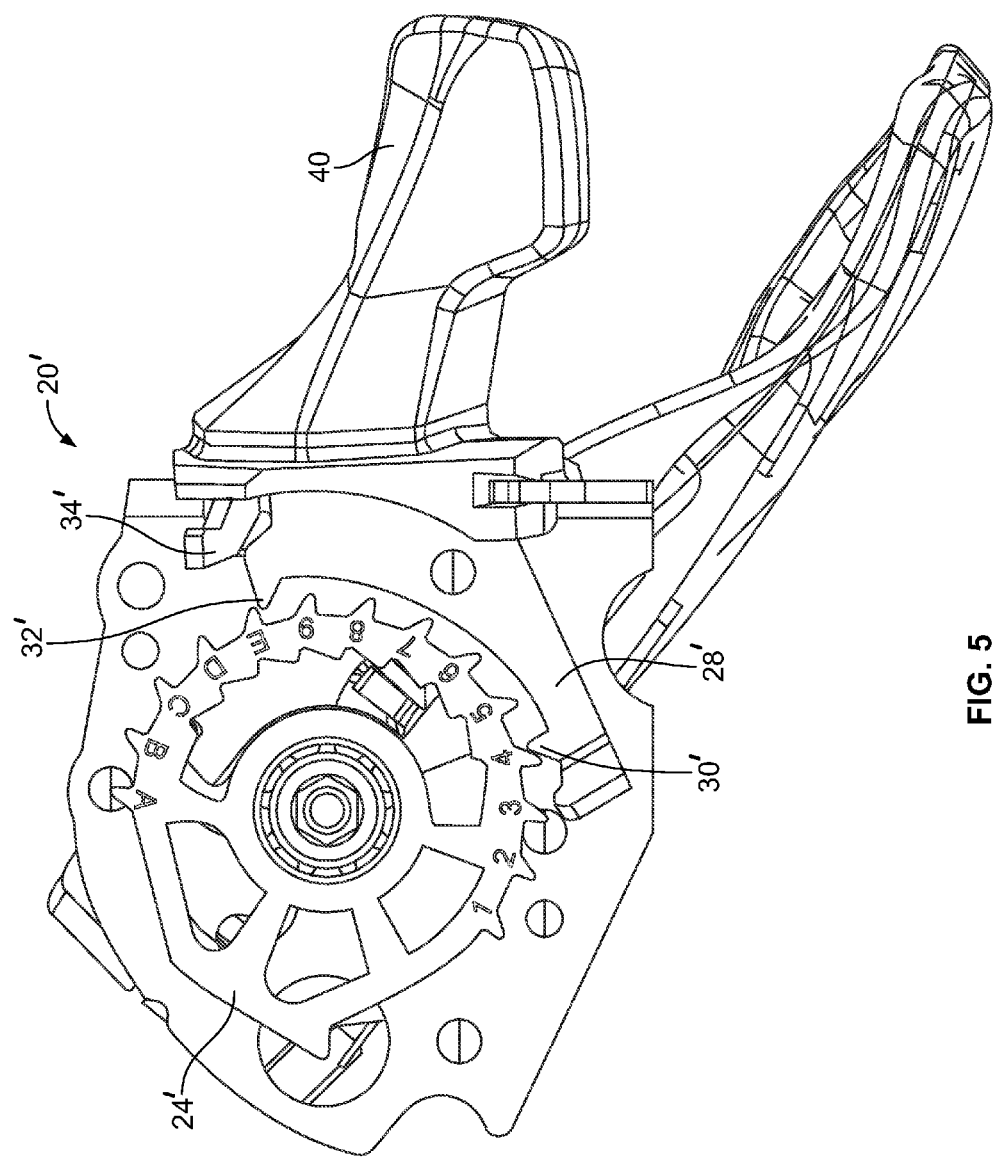

This rotation continues until the engagement shown in FIG. 4 occurs between the safety catch 32' and tooth E of the toothed-disk arrangement 24'. When the user stops exerting pressure on the actuation lever 40, the locking latch 28' begins to pivot back to the hold position thereof as shown in FIG. 5. In the process, the safety catch 32' of locking latch 28' and tooth E of toothed-disk arrangement 24' disengage. Now, the toothed-disk arrangement 24' begins to further rotate clockwise again.

Figure 6:
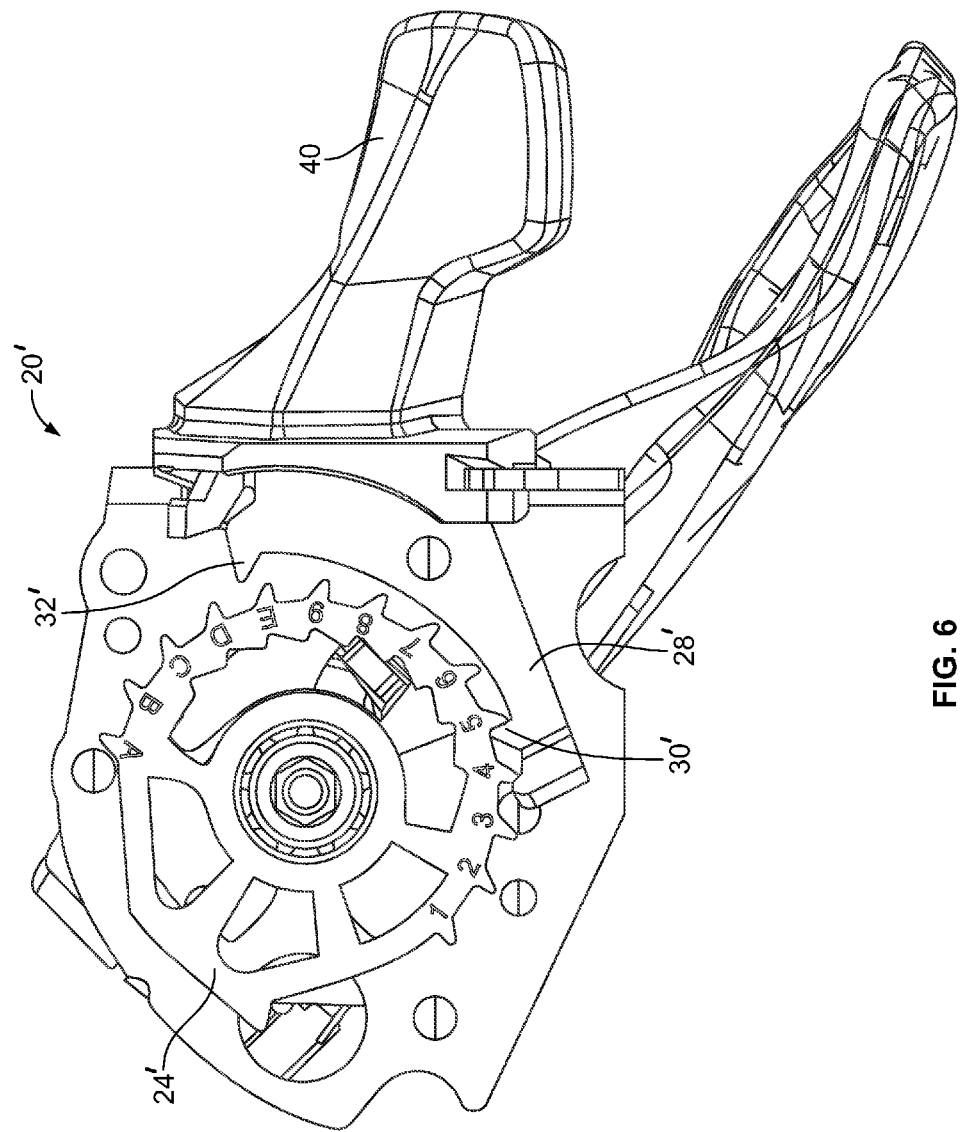

Finally, shown in FIG. 6 is the state in which tooth 5 of toothed-disk arrangement 24' and the locking catch 30' of locking latch 28' engage with one another. In this state, the toothed-disk arrangement 24' is held in the fifth actuation position thereof by the locking latch 28'.

Figure 7:
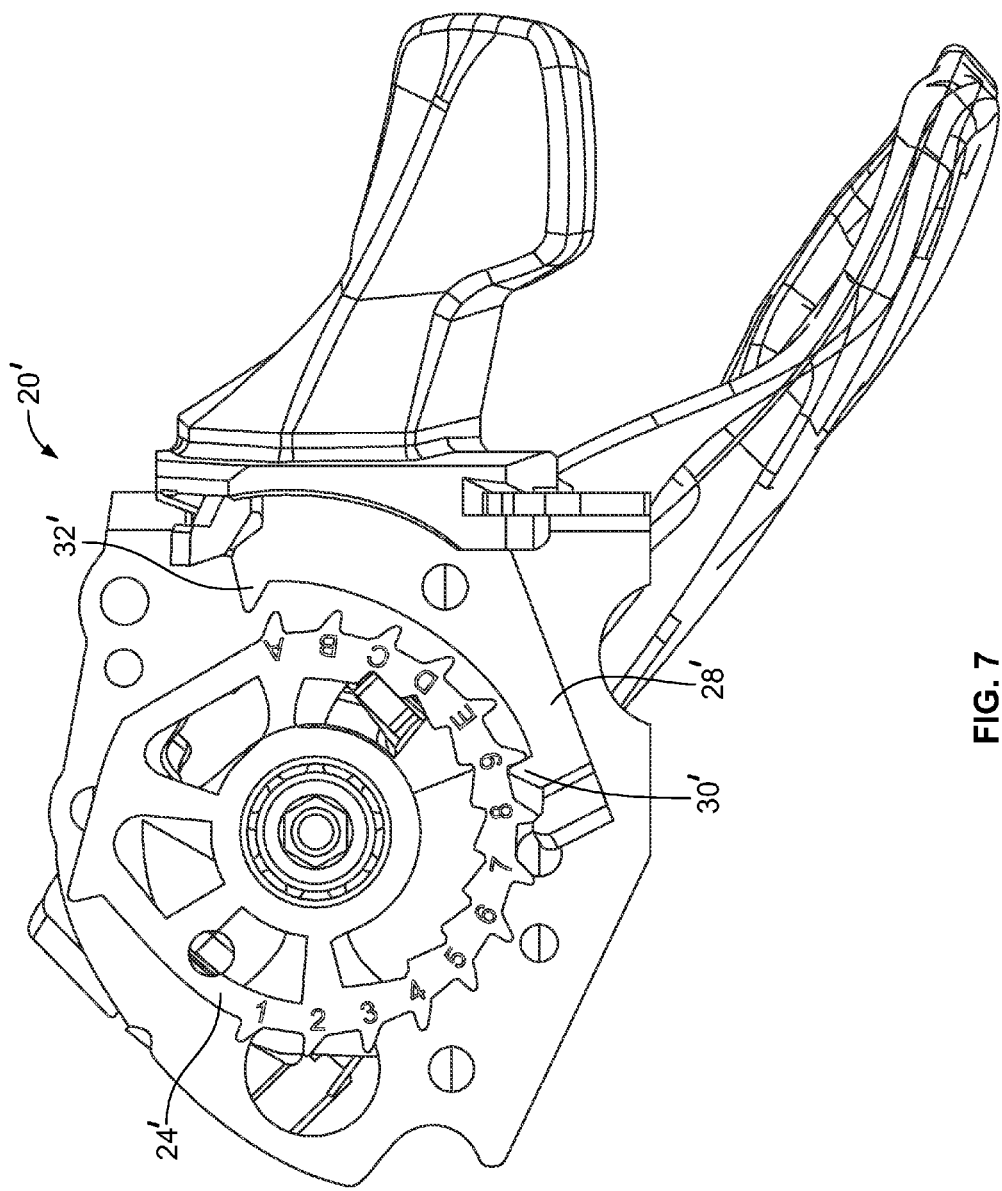

Shown in FIG. 7 is a state of the step shifter in which the toothed-disk arrangement 24' is held in the ninth actuation position thereof. It can be seen that by selecting the number of teeth 1-9 and A-E of the toothed-disk arrangement 24' as seen counterclockwise from tooth A, there is no tooth available any longer at the toothed-disk arrangement 24' that could engage with the safety catch 32' of the locking latch 28' when another release procedure is initiated. In this way, up-shifting from the ninth to the tenth actuation position is achieved without the toothed-disk arrangement 24' being intermediate held any further.

The tenth actuation position, i.e. the actuation position of maximum pull-out, can be defined by an internal stop in the step shifter for the toothed disk or for the cable take-up device, which is designed as a winding drum, for example. In contrast, however, it is preferred for the actuation position of maximum pull-out to be defined non-specifically by way of the device actuated using the step shifter, namely an actuation position of the device corresponding to the state of maximum cable pull-out, and for example by an adjustable stop of the device, for example a derailleur device of a bicycle derailleur.

In this regard, it must be explained that the exemplary embodiments described above assume that the actuation cable is biased in the pull-out direction by the device to be actuated so that the reference cable is pulled out based on this tension exerted by the actuated device with the aid of the spring element mentioned.

Figure 8:
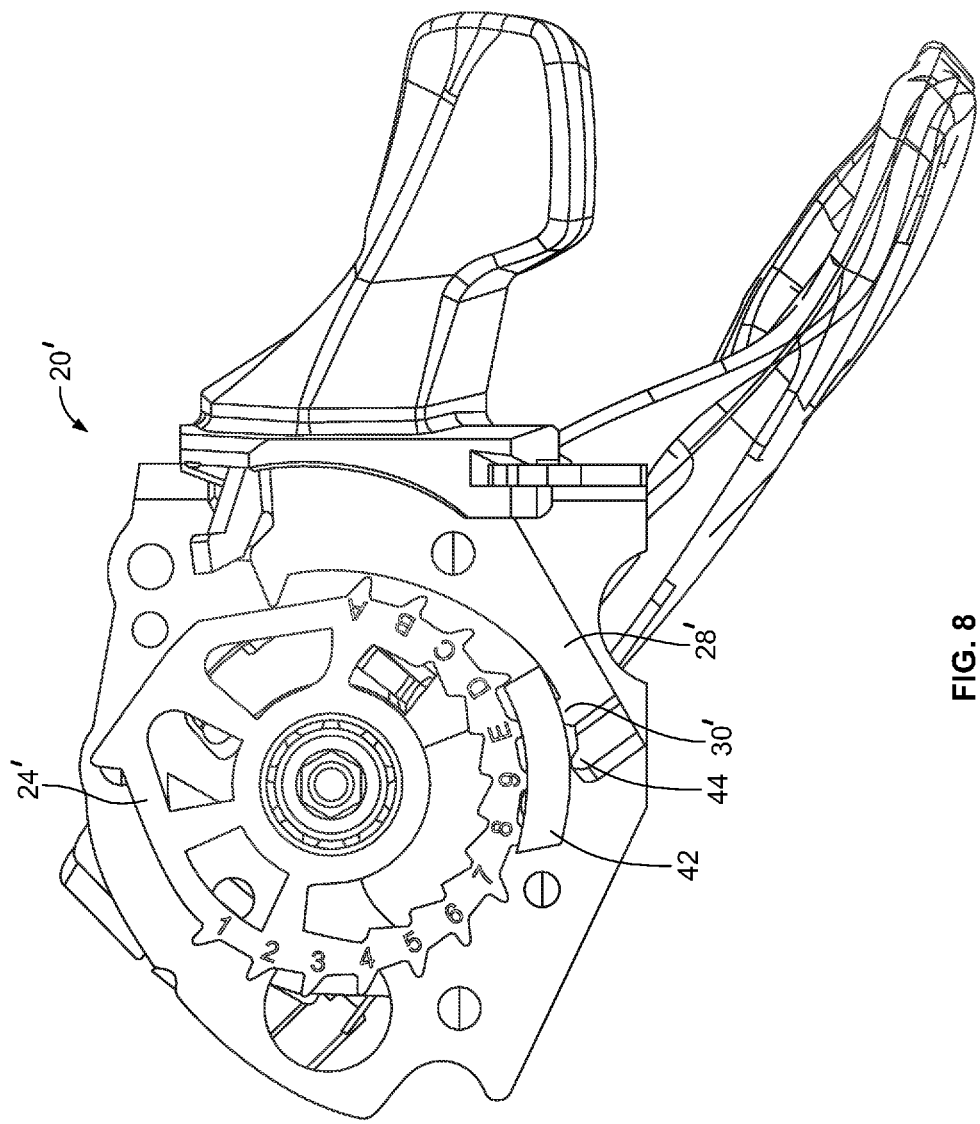

The actuation position to be reached when the toothed-disk arrangement 24' is released from the ninth actuation position consequently corresponds to the actuation position of maximum pull-out of the step shifter 20'. This actuation position of maximum pull-out is shown in FIG. 8. The cam element 42 which is rigidly connected to and above the toothed-disk arrangement 24' can be seen here. This element was not shown in the previous figures for reasons of clarity. In the actuation position of maximum pull-out shown in FIG. 8, engagement occurs between the cam element 42 and a fixing edge 44 that extends upward at the end of the locking latch 28' which likewise contains the locking catch 30'. The engagement between the cam element 42 and the fixing edge 44 causes the locking latch 28' to not be able to pivot back to the hold position thereof in this actuation position of the toothed-disk arrangement 24'. Thus, this actuation position is not defined by an engagement of the locking latch 28' with the toothed-disk arrangement 24', but can be finely adjusted using the end stop outside the step shifter 20' mentioned previously.

Figure 9:
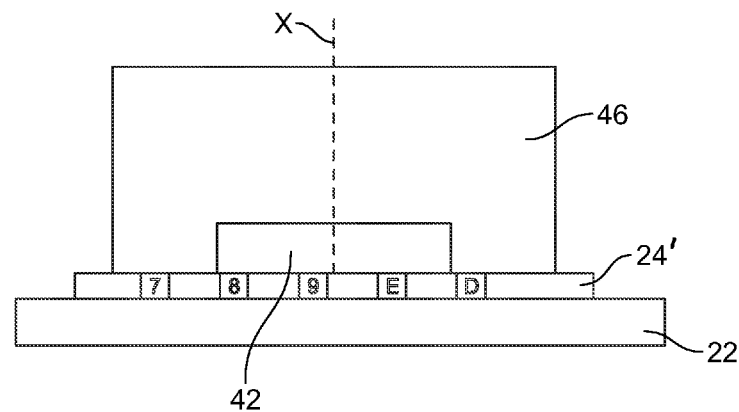
FIG. 9 is a general schematic side view of a toothed-disk arrangement and a cable take-up device of a step shifter of the second embodiment.

To clarify a possible arrangement of toothed disk 24', cam element 42 and cable take-up device 46, further reference is made to FIG. 9. Shown here is the assembly made up of the toothed disk 24' and the cable take-up device 46 near the teeth 7-9, E and D as shown from the side. As can be seen, the cam element is rigidly attached to the cable up-take device 46 above the toothed disk 24' as seen from the base plate 22 and essentially spans the teeth 8, 9 and E of toothed disk 24'. Since the cam element 42 does not extend into the plane of the toothed disk 24', there is no engagement occurring between the cam element 42 and the locking catch 30' or the safety catch 32' of the locking latch 28' independent of the rotational position of the toothed disk 24' relative to the locking latch, which is not shown in FIG. 9. The cam element can consequently only engage with the fixing edge 44 in the rotational position of toothed disk 24' shown in FIG. 8.

Figure 10:
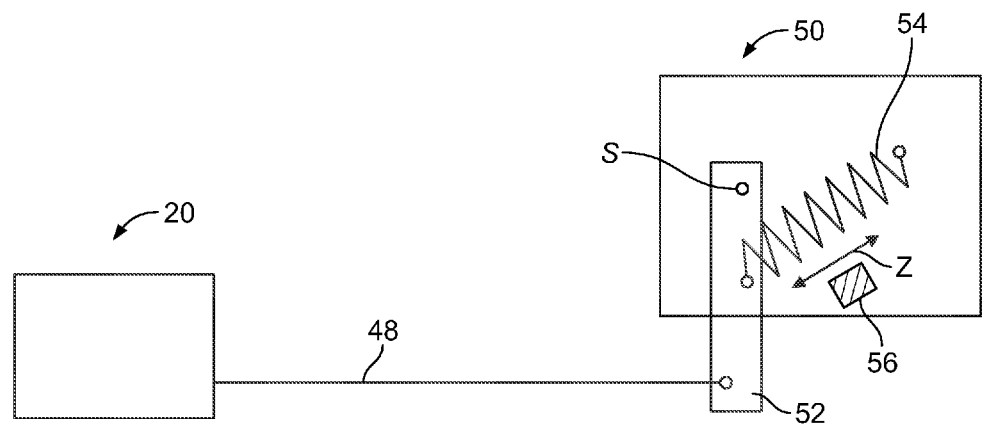
FIG. 10 a general schematic representation of a system comprising a step shifter according to the invention, an actuation cable and a device actuated by the step shifter.

Finally, FIG. 10 shows the system according to a useful exemplary embodiment in general schematic representation, the system comprising the step shifter 20, actuation cable 48 and device 50 that can be actuated by the step shifter. In this system, the actuatable device 50 can in particular be a bicycle chain switching system, wherein the motion of a derailleur actuatable by an actuation cable 48 is coupled to an actuation element 52 in which the actuation cable 48 (for example the wire cable of a Bowden cable) is held. The chain switching system 50 further comprises another spring element 54 that pre-tensions or biases the actuation element 52 which can pivot about pivot axis S, thereby pre-tensioning the actuation cable 48 as well to an actuation position of maximum pull-out of the actuation cable 48. For fine adjustment of this actuation position of maximum pull-out and thereby an actuation position of the derailleur, an end stop 56 is provided in the actuatable device 50 along an axis Z.

What is provided is a hold and release mechanism for holding and releasing a cable take-up device of a step shifter. The device includes a toothed disk arrangement that is part of the cable take-up device as a single piece or is connected or can be connected rigidly thereto and can rotate therewith about a first axis (X). The toothed disk arrangement includes a plurality of teeth at the outer periphery thereof. An adjustable locking latch is preferably pivotable about a second axis (Y). The latch, in a first position when the toothed-disk arrangement is located in various first rotational positions, in particular in a first rotational position, engaging by way of a locking catch with a tooth from the plurality of teeth that acts as a locking tooth associated with the respective first rotational position, to hold or stop the toothed disk arrangement and thereby the cable take-up device in the respective first rotational position. The latch also, in a second position when the toothed-disk arrangement is located in various second rotational positions, in particular in a second rotational position, engaging by way of a safety catch with a tooth from the plurality of teeth that acts as a safety tooth associated with the respective second rotational position, to hold or stop the toothed disk arrangement and thereby the cable take-up device in the respective second rotational position. The first rotational positions correspond to the actuation positions of the actuation cable or a subset of the actuation positions and the second rotational positions correspond to intermediate positions of the actuation cable when the actuation cable is transitioned between adjacent actuation positions through release of the actuation cable.

Whilst the invention has been described with regard to the associated embodiments, it can be seen that various amendments can be undertaken within the scope of protection of the inventive concept. Accordingly the invention is not limited by the disclosed embodiments, but has the entire scope of protection of the following claims.

The invention claimed is:

1. A hold and release mechanism for holding and releasing a cable take-up device of a bicycle shifter for holding an actuation cable in a plurality of actuation positions with the cable take-up device, the plurality of actuation positions including a maximum pull-out position to a maximum pull-in position, the hold and release mechanism step-by-step releasing of the actuation cable in a release direction, the hold and release mechanism comprising:

a toothed-disk arrangement coupled with the cable take-up device for rotating together about a first axis, the toothed-disk arrangement including a plurality of teeth at an outer periphery thereof, the plurality of teeth including locking and safety teeth, the locking teeth disposed in a first tooth plane orthogonal to the first axis, the safety teeth disposed in a second tooth plane that is orthogonal to the first axis and offset relative to the first tooth plane; and a single piece adjustable locking pawl pivotably mounted about a second axis, the adjustable locking pawl including locking and safety catches, the locking catch engaging with one of the locking teeth of the first plane for holding the toothed-disk arrangement in a first rotational position, the safety catch engaging with one of the safety teeth of the second plane for holding the toothed-disk arrangement in a second rotational position, the first rotational position corresponding to one of the plurality of actuation positions of the actuation cable and the second rotational position corresponding to intermediate positions of the actuation cable when the actuation cable is transitioning between adjacent ones of the plurality of actuation positions when releasing the actuation cable.

2. The hold and release mechanism according to claim 1, wherein the locking catch of the locking pawl is disposed in the first tooth plane and the safety catch of the locking pawl is disposed in the second tooth plane.

3. The hold and release mechanism according to claim 1, wherein the locking teeth extend over a first angular range relative to the first rotational axis and the safety teeth extend over a second angular range relative to the first rotational axis, the second range overlapping the first angular range.

4. The hold and release mechanism according to claim 1, wherein the toothed-disk arrangement includes two toothed disks coupled together, one of the two toothed disks including the locking teeth and the other of the two toothed disks including the safety teeth.

5. The hold and release mechanism according to claim 1, wherein the maximum pull-out position is not associated with any of the safety teeth.

6. The hold and release mechanism according to claim 5, wherein a majority of the plurality of teeth of the toothed-disk arrangement includes a group of teeth that act both as locking teeth and safety teeth depending on the rotational position of the toothed-disk arrangement, wherein the toothed-disk arrangement includes a toothed disk that includes the group of teeth.

7. The hold and release mechanism according to claim 6, wherein relative to the first axis an angular distance between the locking catch and the safety catch of the locking pawl is one of greater than an angular distance and a minimum angular distance between directly adjacent teeth of the group of teeth that act as both the locking and safety teeth depending on the rotational position of the toothed-disk arrangement.

8. The holding and release mechanism according to claim 1, wherein the toothed-disk arrangement and thereby the cable take-up device is configured to transition from a rotational position corresponding to an actuating cable actuation position that precedes the maximum pull-out position directly to the rotational position of the toothed-disk arrangement that corresponds to the maximum pull-out position of the actuation cable by releasing the actuation cable without holding the toothed-disk arrangement at an intermediate position by way of the safety catch and one of the safety teeth.

9. The holding and release mechanism according to claim 1, wherein relative to the first axis an angular distance between the locking catch and the safety catch of the locking pawl is one of larger than twice the angular distance and double the minimum angular distance between the directly adjacent locking teeth, and is smaller than the angular distance of the rotational positions of the toothed-disk arrangement corresponding to the maximum pull-out position and maximum pull-in position, respectively.

10. The hold and release mechanism according to claim 1, wherein the first axis and the second axis are substantially parallel to one another.

11. The holding and release mechanism according to claim 1, further comprising a lock-out device for removing or keeping removed locking catch from the pivot position thereof in at least one pre-determined rotational angle range of the toothed-disk arrangement, the rotational angle including at least a rotational position of the toothed-disk arrangement corresponding to one of the plurality of actuation positions.

12. The hold and release mechanism according to claim 11, wherein the lock-out device includes at least a cam element coupled with one of the cable take-up device and the toothed-disk arrangement configured to act on the locking latch so that the locking latch is removed from the first pivot position thereof or kept removed therefrom.

13. The hold and release mechanism according to claim 11, wherein that the at least one pre-determined rotational angle range of the toothed-disk arrangement includes the rotational position of the toothed-disk arrangement corresponding to the maximum pull-out position.

14. The hold and release mechanism according to claim 1, wherein the locking pawl can be shifted in the pull-out direction from the first rotation position toward the second rotation position by at least one step using an actuation device for purposes of releasing the actuation cable.

15. The hold and release mechanism according to claim 1, wherein the toothed-disk arrangement and thereby the cable take-up device of a switching mechanism can assume at least six different rotational positions, each of which is associated with a respective one of the plurality of actuation positions of the actuation cable.

16. The hold and release mechanism according to claim 1, wherein the pawl further comprises at least one angled section configured to place the locking catch in the first plane and the safety catch in the second plane.

* * * * *